United States Patent [19]
Boyd et al.

[11] Patent Number: 5,821,721
[45] Date of Patent: Oct. 13, 1998

[54] MOTOR CONTROL SYSTEM ESPECIALLY FOR CONTROL OF AN OPTICAL SCANNER

[75] Inventors: Raymond J. Boyd, Holcomb; Edward C. Bremer, Rochester, both of N.Y.

[73] Assignee: PSC Inc., Webster, N.Y.

[21] Appl. No.: 837,817

[22] Filed: Apr. 22, 1997

Related U.S. Application Data

[63] Continuation of Ser. No. 443,806, May 18, 1995, abandoned, which is a continuation of Ser. No. 166,538, Dec. 14, 1993, abandoned.

[51] Int. Cl.$^6$ .................................................. A02K 29/08
[52] U.S. Cl. .......................................... 318/685; 318/254
[58] Field of Search .................................... 318/254, 138, 318/439, 685, 696; 235/462–466

[56] References Cited

U.S. PATENT DOCUMENTS

| | | | |
|---|---|---|---|
| 3,708,737 | 1/1973 | Johnson | 318/636 |
| 4,027,215 | 5/1977 | Knight et al. | 318/254 |
| 4,238,717 | 12/1980 | Knight et al. | 318/254 |
| 4,241,299 | 12/1980 | Bertone | 318/474 |
| 4,492,903 | 1/1985 | Knight et al. | 512/254 |
| 4,743,815 | 5/1988 | Gee et al. | 312/254 |
| 4,780,651 | 10/1988 | Nakano et al. | 318/254 |
| 4,928,843 | 5/1990 | Plunkett | 318/254 |
| 4,970,445 | 11/1990 | Kimura et al. | 318/254 |
| 5,057,753 | 10/1991 | Leuthold et al. | 318/254 |
| 5,130,620 | 7/1992 | Inaji et al. | 318/254 |
| 5,200,597 | 4/1993 | Eastman . | |
| 5,221,881 | 6/1993 | Cameron | 318/254 |
| 5,258,699 | 11/1993 | Grodevant . | |

*Primary Examiner*—David S. Martin
*Attorney, Agent, or Firm*—Foley & Lardner

[57] ABSTRACT

A light beam, which scans in opposite directions across a bar code, is controlled in velocity and scan angle by monitoring the voltage across a winding of a motor, such as one of the phase windings of a two phase stepper motor, which causes the beam to scan across a field of view where the bar code is located. In order to enable the winding, which carries current for driving the motor, circuitry that inhibits the voltage from inductive generation (the back EMF) into the winding during periods when the drive current is applied to the motor. The drive current is applied in pulses, and preferably in groups of pulses, which groups recur periodically. In one embodiment of the invention, which utilizes a motor with two phase windings, the groups of pulses are applied alternately to different ones of the windings and the voltage due to inductive generation is derived from one of these windings during the time period where the pulses are applied to the other winding. In another embodiment, a motor having a single winding is used. Here, the inductively generated voltage is derived during an interval between successive drive pulses. The peak value of the inductive component is proportional to scan angle and beam velocity and is derived for use in a programmed microprocessor that varies the duration of the drive pulses in order to maintain the beam velocity and scan angle at preset, desired values.

20 Claims, 4 Drawing Sheets

MOTOR CONTROL SYSTEM ESPECIALLY FOR CONTROL OF AN OPTICAL SCANNER

This application is a Continuation of application Ser. No. 08/443,806, filed May 18, 1995; which is a Continuation of Ser. No. 08/166,538, filed Dec. 14, 1993 now abandoned.

BACKGROUND

The present invention relates to motor control systems for driving and controlling the velocity of rotation of the output shaft of an electric motor, and also for driving and controlling the motor to execute reciprocal oscillating motion over a predetermined angular displacement.

The present invention is especially suitable for use in bar code scanners for controlling the deflection of the beam that scans a bar code so that it scans over a desired scan angle in opposite directions; the beam thereby providing light that when returned to the scanner can be detected and used to read the bar code. Aspects of the invention may find other applications in optical scanning, where an object in a field of view is to be scanned with a beam which travels with a desired velocity and/or over a desired scan angle. The invention may find other applications wherever motors are used in which the velocity of or the angle over which the rotor or shaft of the motor turns is to be stabilized or controlled.

The present invention is an improvement over the motor control system which is described in U.S. Pat. No. 5,258,699 issued Nov. 2, 1993 to Scott R. Grodevant. The principle of using the signal induced into a winding of a motor (effectively the inductance of that winding) varies in accordance with the velocity and/or angular displacement (during a certain period of time) of the output shaft of the motor is described in the Grodevant patent. That principle is implemented in the patent with a motor, namely a stepper motor having two phases or windings through one of which drive current pulses are passed. A constant current is passed through the other winding modulated with an alternating current component corresponding to the velocity of the rotor and the output shaft. In effect the inductance of the other winding changes in accordance with the position of the rotor. The voltage across the other winding is then sensed and utilized to control the drive pulses to the driven winding to control the velocity and/or angular displacement of the rotor and output shaft of the motor to reduce variations in the scan angle and velocity, and particularly long term variations such as due to changes in friction of the moving elements of the motor, thermal effects and the like.

It is sometimes desirable to drive both windings of a two phase stepper motor since more stable operation is achieved than when only one winding is driven. Also, in portable applications, common for bar code scanners, particularly of the hand held type, the need for a continuous bias current through the winding used to sense the angular displacement and velocity of the output shaft is undesirable from a power conservation viewpoint since the consequent current drain reduces operating time, before recharging or replacement of the battery. It is also desirable at times to use a motor having only one winding and nevertheless sense the inductively generated component indicative of shaft velocity and displacement angle, in the case of a motor driven to oscillate reciprocally as required in optical beam scanners.

SUMMARY

A general object of the invention is therefore to provide an improved motor control system in which variations in velocity and displacement angle (where the motor shaft oscillates reciprocally) may be reduced.

It is a more specific object of the invention to provide an improved motor control system for reciprocally oscillating an output shaft which may be coupled to an optical scanning device for moving an optical beam so as to scan reciprocally over a field of view where an object or symbol (e.g. a bar code) to be scanned is located.

It is a still further object of the present invention to provide an improved motor control system for oscillatorily driving an optical beam scanner to scan an optical beam reciprocally with minimum variations in scan angle and beam velocity to facilitate scanning and reading of optical symbols such as bar codes.

Briefly described, a motor control system in accordance with the invention controls a motor having at least one winding and an output shaft. This system utilizes means that pass drive current periodically through the winding for rotating the shaft with predetermined motion (velocity or angular displacement, when the shaft is oscillated reciprocally). Means are provided for sensing voltage across the winding due to the drive current and also due to inductive generation and providing an output signal corresponding to the sensed voltage. Means are provided for inhibiting the output signal during periods when the drive current is passing through the winding so that the output signal represents the voltage due to inductive generation alone. From this voltage there is obtained, preferably by peak detection, a peak output representing the velocity and/or angular displacement of the shaft. The peak output may be obtained using analog circuits and digitized for computer processing, or the peak output may be computed digitally in a computer such as a microprocessor. The microprocessor then responds to the peak output and controls the drive current to the winding of the motor, which current may be produced in pulses and particularly groups of pulse. The pulse can have opposite polarity in each group when the motor has only a single winding or can over unipolar pulses when the groups pulses are applied to different windings, such as the phase windings of a two phase stepper motor. The duration or duty cycle of the pulses may be controlled thereby controlling the motion (velocity and/or scan angle) of the output shaft.

BRIEF DESCRIPTION OF THE DRAWINGS

The foregoing and other objects, features and advantages of the invention as well as presently preferred embodiments thereof will become more apparent from a reading of the following description in connection with the accompanying drawings in which.

DETAILED DESCRIPTION

Figure 1:
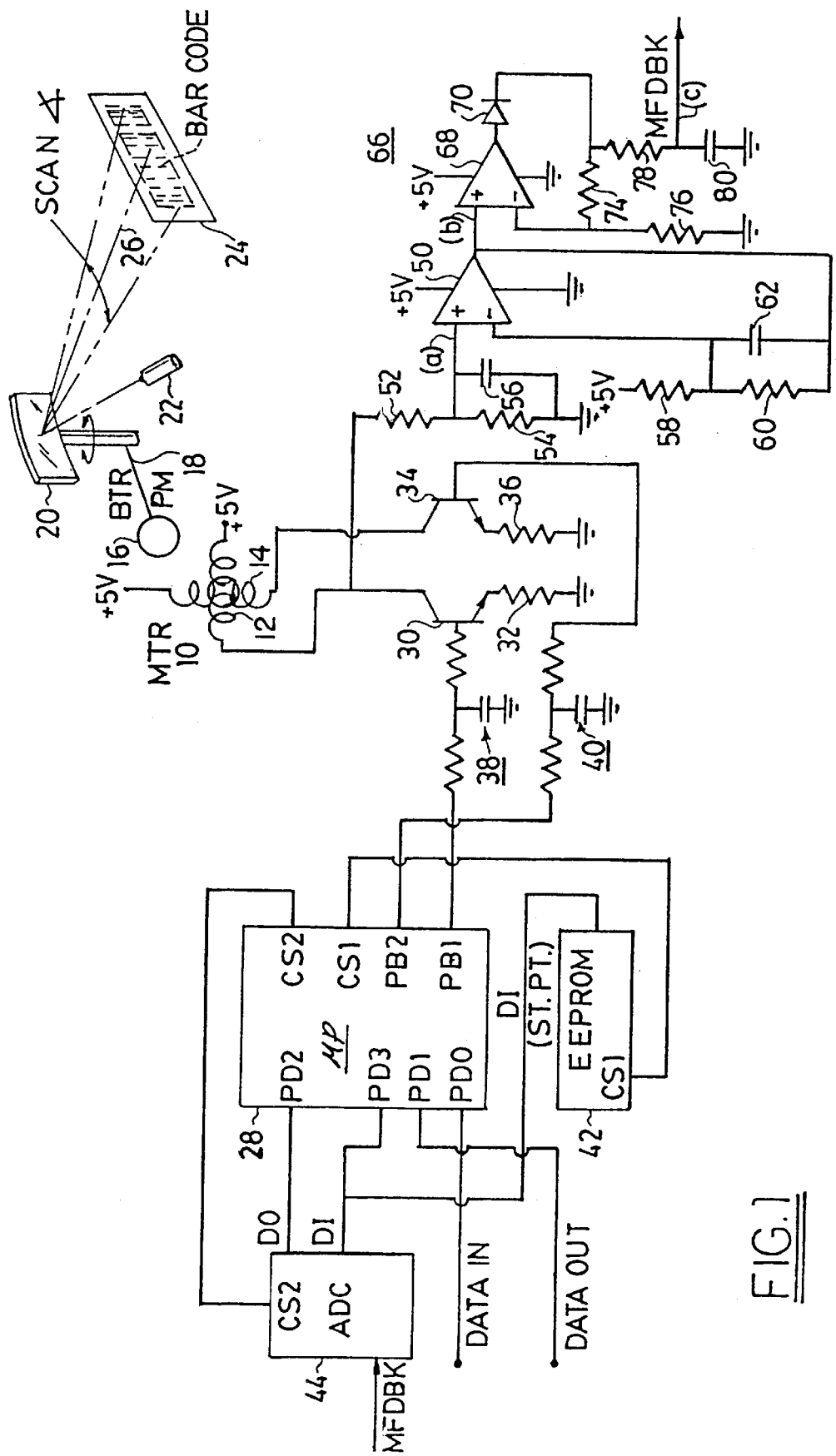
FIG. 1 is a schematic diagram of an optical scanner motor control system embodying the invention.

Referring to FIG. 1, there is shown a stepper motor 10, which may be a commercial two phase stepper motor having two phase windings 12 and 14. The rotor 16, which may be a permanent magnet rotor, and the output shaft 18 reciprocally oscillates a reflector mirror 20, which scans a optical beam from a laser 22, for example, a laser diode across a field of view in which a bar code 24 may be located. The beam is deflected on opposite sides of an axis 26 through the center of scan (the distance in the field of view over which the beam scans). The beam scans over a desired scan angle, for example 28° and desirably scans at a predetermined velocity to facilitate decoding of the bar code from a signal representing the bar code obtained from the light returned from the code as the beam scans over the code, which signal represents the bar code.

A photodetector, the optical components, the motor 10 and the motor control circuit shown in FIG. 1, which circuit includes a microprocessor 28 and related digital components, may be part of a scan engine. The design and operation of such circuits and also the design and operation of the other components of the engine, both optical and electronic, may be found in U.S. Pat. No. 5,200,597 issued to J. M. Eastman, et al. on Apr. 6, 1993.

The optical components provide the scanning beam may utilize a deflector or may alternatively use other optical scanning devices that are oscillatorily reciprocated over the scan angle to provide successive scans in opposite directions.

Figure 2:
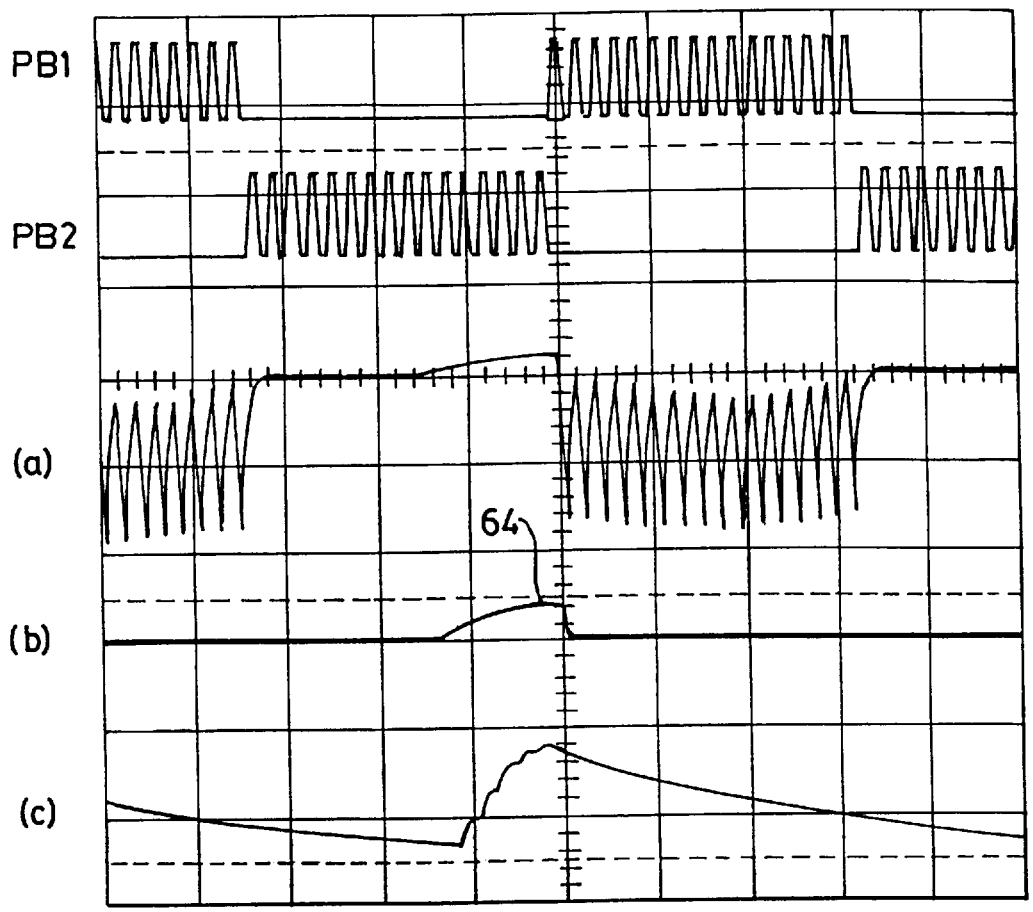
FIG. 2 is a timing or waveform diagram showing the signals appearing at different points in the system shown in FIG. 1.

Returning to the motor control circuit of FIG. 1, the winding 12 is connected, via the emitter and collector path of a drive transistor 30 to a point of reference potential such as ground via a current control resistor 32. Similarly, the other winding 14 is connected through the emitter and collector path of another transistor 34 and a current control resistor 36 to ground operating voltage, from a source of voltage with which the transistors and other electrical components of the system are designed to operate, say 5 volts, is applied to one end of each of the windings 12 and 14 so that current can flow through the windings when the transistors 30 and 34 are driven "on" by positive pulses obtained from output ports indicated at PB1 and PB2 of the microprocessor 28. These pulses are applied to the bases of the transistors via low pass resistance-capacitance filters 38 and 40. The pulses may be generated in groups of approximately 16 pulses, which occur periodically as shown by the waveforms PB1 and PB2 in FIG. 2. Thus, current pulses pass through the winding 12 and 14 in successive groups. These are unipolar drive pulses that cause the rotor 16 and shaft 18 to oscillate reciprocally in opposite direction with a velocity that depends upon the power applied to the windings. The power is varied by varying the duration or duty cycle of the pulses and each of the trains of groups of pulses passing through the windings 12 and 14. Reference may be had to the above identified Grodevant and Eastman et al. patents for further information on the design and operation of the circuits that can drive current pulses through the motor windings.

The microprocessor 28 has its operating parameters stored in a read only memory 42 such as a commercially available electrically erasable programmable read only memory (EEPROM). One of the parameters of the program is a set point data byte that sets the desired velocity and scan angle. The scan angle is determined by the velocity of the shaft during the period of each group of pulses that drives the motor and its rotor in each of the opposite directions. The data for the program is applied to a serial port SP of the computer system which is connected to a data input line to the ports PD0 and PD1 of the microprocessor 28. The data is stored to the read only memory 42.

Input data for controlling the scanning velocity and thus the scan angle is obtained from an analog to digital converter (ADC) 44, which provides data when enabled by an enabling pulse from the C52 of the microprocessor 28, and a conversion is requested by a serial command from the PD 2 port of the microprocessor 28. The set point data is inputted to PD3, when an enabling pulse is provided from the CS1 output terminal of the microprocessor 28 to the enabling terminal CS1 of the memory 42 and the data is requested by a serial command from the microprocessor 28 from PD2. The control signal for controlling velocity and scan angle is an analog signal, which is applied to the ADC 44 on line MFDBK. This signal is obtained in response to the voltage induced in one of the windings, namely the winding 12, of the motor.

A differential amplifier 50, implemented from an operational amplifier, is used to derive the inductive component and for effectively inhibiting the drive pulses, which pass through the winding 12 periodically, from being sensed. The voltage across the coil 12 appears across a voltage divider made up of resistors 52 and 54. The resistor 54 is shunted by a capacitor 56 to eliminate noise and other high frequency components. The time constant of the circuit 54, 56 is selected to prevent the average value of the voltage appearing at the direct input of the operational amplifier 50 from varying during the periods of occurrence of the groups of pulses. The signal appearing at the direct terminal is shown at (a) in FIG. 2 and consists of the pulse train during the period when the drive pulses, reduced by the dividing ratio of the resistors 52 and 54 are applied. The values of these resistors may be equal so that the average value of these pulses is less than 2.5 volts. During the period between pulses, the average value is essentially equal to 2.5 volts, since the transistor 30 is cut off. The 2.5 volts is effectively modulated and has an alternating current component corresponding to the velocity of the output shaft 18 and the rotor 16, and the effective inductance of the winding 12. This component is due to inductive generation into the winding 12 and is approximately equal to the back EMF of the motor 10 divided by the ratio of the values of resistors 52 and 54.

The circuitry shown in FIG. 1 derives this component while inhibiting the voltage across the coil during the period that the drive pulses are passing through the winding. This is accomplished by setting the inverting input of the amplifier 50 at a voltage approximately equal to the voltage at the direct input while the transistor 30 is cut off and the drive pulses are not passing through the winding 12. The inverting input is connected through a divider resistors 58 and 60; the resistor 60 being shunted by a capacitor 62. The values of the resistors 52, 54 and the capacitor 56 may be the same as the values of the resistors 58 and 60 and the capacitor 62, respectively. Since the average value of the voltage at the direct terminal is much less than the voltage at the inverting terminal during the period of the drive pulses, the differential amplifier 50 will tend to drive the inverting input towards the direct input, but since the output of the differential amplifier 50 is limited by the rail voltages plus 5 volts and ground (the operating voltage range of the differential amplifier), during the period of the drive pulses, the output of the differential amplifier is essentially at ground as shown in waveform (b). However, the inductively generated component is amplified in the amplifier 50 and appears as a pulse, whenever the direct input to the amplifier 50 exceeds the reference voltage (2.5 volts). The operational amplifier 50 therefore inhibits the output signal during the drive pulses and transmits the inductively generated voltage, which is indicated at 64 in waveform (b) of FIG. 2.

The output of the differential amplifier also eliminates the common mode voltage, in this case 2.5 volts, so that only the pulse is applied to the direct input of another amplifier stage 66 that may be implemented by an operational amplifier 68. A peak detecting diode 70 is connected in a feedback path through feedback resistor 74 to the inverting input of the amplifier 68. The gain is determined by the value of the resistor 74 and a shunt resistor 76, and may suitably be set at approximately ten. The inductively generated component pulses 64 are peak detected and amplified. They are held by a capacitive circuit including a resistor 78 and a capacitor 80. The hold time constant of the circuit including the capacitor 80 and the resistors 74, 76 and 78 assures that the voltages are held at least during the period between successive groups of drive pulses as shown at waveform (c) in FIG. 2. The output indicated as MFDBK is an analog voltage which is converted into a digital input in the ADC 44.

Instead of an analog peak detector such as shown at 66 in FIG. 1, the ADC 44 may be operated to sample the voltage at the output of the amplifier 68 or the amplifier 50 and the microprocessor is then used to compute the peak value thereof as discussed in the above-referenced Grodevant patent. The illustrated analog, peak detector and amplifier stage 66 is presently preferred.

The computed peak value or the converted peak value is input to the microprocessor. The microprocessor is programmed to compare that peak value with the set point value for the desired scan angle and/or scan velocity. The duration of the pulses generated at PB1 and PB2 is varied to reduce any variation in the scan angle and velocity of the beam from the preset or set point value. The programming of the microprocessor for controlling the duration of the drive pulses may be of the type described in the Grodevant patent referenced above.

Figure 3:
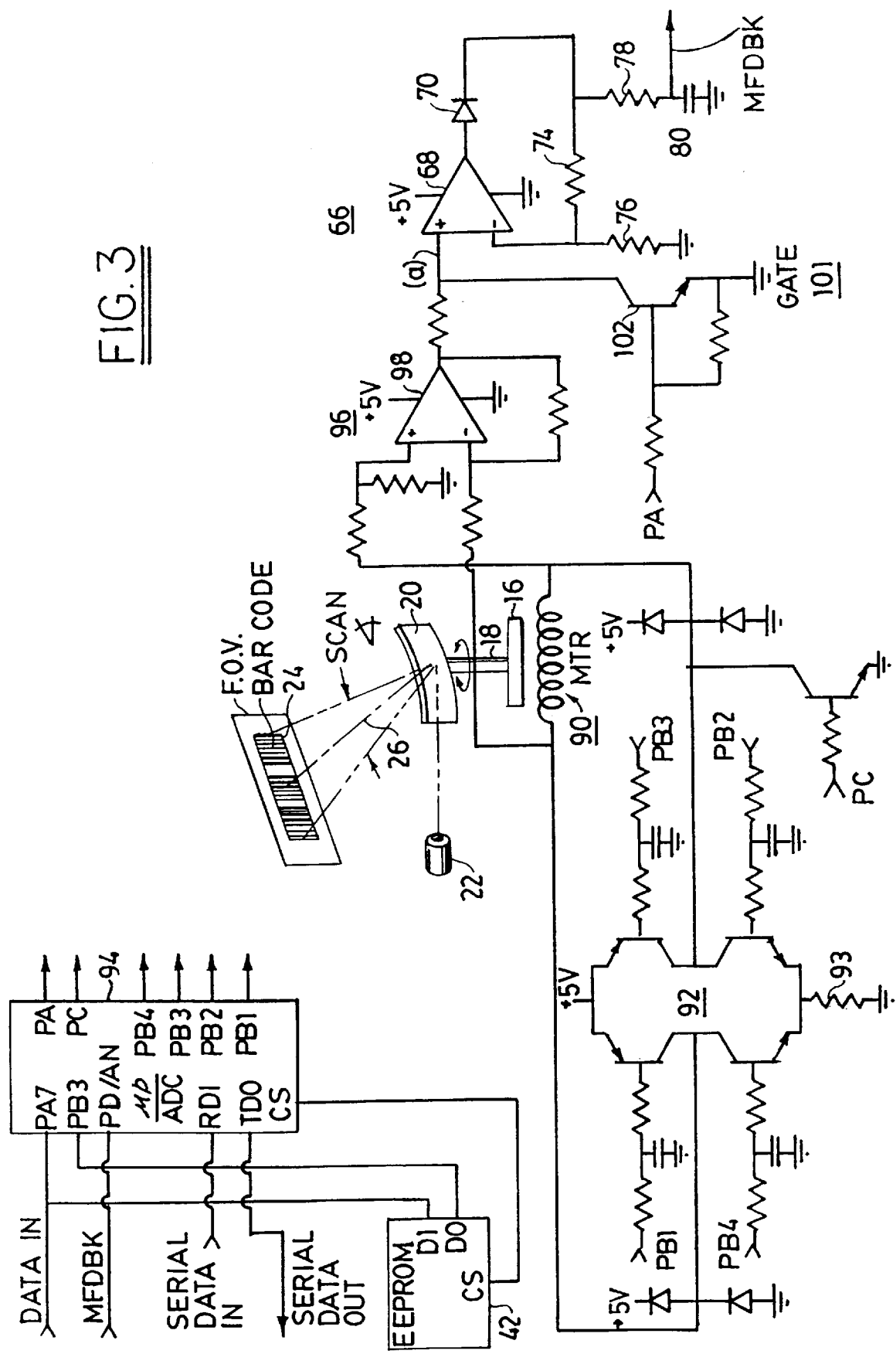
FIG. 3 is a schematic diagram of an optical scanner motor control system in accordance with another embodiment of the invention where a motor having a single winding is utilized to scan the beam.

Referring to FIG. 3, there is shown a motor 90 having a single winding, which may be a stator winding, and a rotor 16, which may be a permanent magnet rotor. The shaft 18 of the motor operates the beam scanning optical components, which may be the same types of components as shown and discussed in connection with FIG. 1. Like parts in the embodiment of FIG. 3 to those shown in the embodiment of FIG. 1 are identified by like reference numerals.

The motor 90 is driven by groups of bipolar drive pulses obtained from a transistor bridge circuit 92. That circuit 92 is similar to the bridge circuit that drives the motor in the scanning engine shown in above referenced Eastman et al. patent. The drive pulses are generated in response to output pulses from output ports, PB1 to PB4, of a microprocessor 94 that contains a built-in analog to digital converter (ADC). The set point data and other programming parameters are stored in a read only memory 42 as discussed in connection with FIG. 1. The circuitry of stages 96 and 66 derives a peak value corresponding to the inductively generated or back EMF voltage appearing across the winding of the motor 90.

This back EMF (an inductively generated voltage) indicates the velocity of the rotor 16 and shaft 18 of the motor 90. The peak value of the back EMF indicates the scan angle since each reciprocal oscillation occurs in a certain preset period of time. This peak value is provided by the peak detecting amplifier circuit stage 66 and is presented to an input port PD/AN of the microprocessor 94 where it is compared with the set point data and used to vary the duration of the groups of pulses passed through the winding of the motor 90 by virtue of the operation of the transistors in the transistor bridge circuit 92. For example, when PB1 and PB2 are high, the upper left and lower right hand corner bridge transistors are on, and current from the source at +5 volts passes through these transistors and the motor coil via a current amplitude control resistor 93. Similarly, when PB3 and PB4 are high, the drive current passes through the winding of the motor 90 in the opposite direction. In other words, bipolar pulses which cause the shaft to oscillate reciprocally over the desired scan angle about the center of scan 26, are generated.

Figure 4:
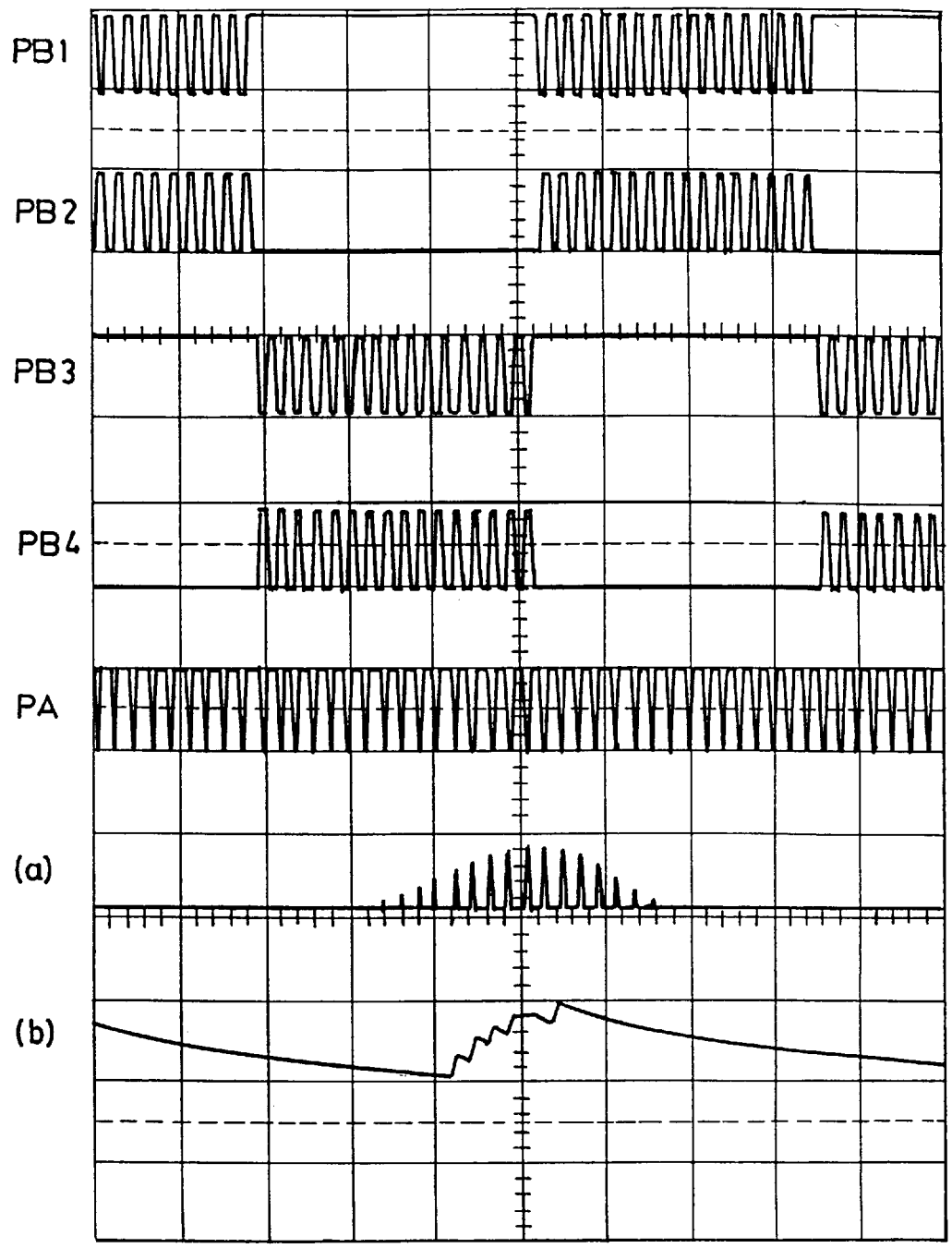
FIG. 4 is a timing or waveform diagram illustrating the signals at different points in the systems shown in FIG. 3.

Voltage across the motor winding is applied to the direct and inverting inputs of a differential amplifier stage 96 utilizing an operational amplifier 98 similar to the amplifier 96. The amplifier stage 96 removes the common mode voltage and provides, as its output, both the voltage due to the drive pulses and the voltage due to the inductively generated component. The inductively generated component occurs between drive pulses. This component is segregated by applying a gating pulse PA, generated in the microprocessor 94 between each of the drive pulses. The gating pulse PA occurs between and is shorter than (e.g. 25–50% as long as) the interval between successive PB1, PB2, PB3 and PB4 pulses. These short gating pulses is in a pulse train indicated at PA in FIG. 4. A gate circuit 101, including a transistor 102, is biased to be conductive, except during each of the negative, short PA pulses. This serves to segregate or separate the inductively generated voltage component appearing across the motor winding 90 from the voltage due to the drive pulses. The voltage due to the inductively generated component is in pulses and builds up to a peak value during each cycle, which peak occurs approximately at the center of the scan. The gated output thus increases to a peak voltage is that detected and stored across the capacitor 80 of the peak detector stage 66. The segregated pulse are shown in waveform (a) of FIG. 4, and the peak voltage appearing across the capacitor 80 is shown in waveform (b). Due to the time constant, of the value of the capacitor 80 and the resistors 74, 76, and 78, the peak voltage decays, so that a new peak voltage is obtained upon each successive scan (The voltage decay between scans as shown in FIG. 4, waveform (b)). The output of the peak detector is MFDBK, which is fed back to the input port of the microprocessor 94 PD/AN for conversion into a corresponding digital value. This digital value is compared with the preset or set point value for the scan angle and varies the duration of the PB1 to PB4 pulses for controlling the scan angle executed by the rotor 16 and the shaft 18 of the motor 90.

From the foregoing description it will be apparent that there has been provided an improved motor control circuit that is especially adapted for operating an optical scanner to scan with oscillatory reciprocal motion over a preset scan angle. Variations and modifications in the herein describe system, within the scope of the invention, will undoubtedly suggest themselves to those skilled in the art. Accordingly, the foregoing description should be taken as illustrative and not in a limiting sense.

We claim:

1. A motor control system for a motor having at least one control winding, and an output shaft, said motor control system comprising:

means for passing drive current periodically through said control winding for rotating said output shaft with a predetermined motion in at least one direction, means for continuously sensing voltage generated across said control winding due to (1) said drive current and (2) due to inductive generation from back EMF and for providing a signal corresponding to said voltage, means for generating an inductive signal output, wherein said means for generating an inductive signal output includes: (1) an input for continuously inputting said signal, and (2) a circuit, including an amplifier, continuously connected to receive said signal and electrically biased to generate said inductive signal output only when said signal corresponds to said inductive generation, and to inhibit said inductive signal output during periods when said signal corresponds to said drive current, and drive current controlling means responsive to said inductive signal output for controlling said drive current and for controlling said motion of said output shaft, wherein said drive current controlling means controls said drive current through a continuous feedback path.

2. The system according to claim 1 wherein said means for generating an inductive signal comprises amplitude response means comprising:

a differential amplifier having a first input, to which said voltage generated across said control winding is continuously applied, and a reference input, to which a reference potential is applied, said reference potential set at a reference potential higher than a peak amplitude of said voltage generated across said control winding when said drive current is passing through said control winding but not exceeding said amplitude of said voltage across said control winding in the absence of said drive current, said differential amplifier providing said inductive signal output when said reference potential is higher than said voltage.

3. The system according to claim 2 wherein said differential amplifier is an operational amplifier having an operating voltage applied thereto and having an output signal voltage range between said operating voltage and a voltage at least equal to said reference potential, said first input being a direct input of said operational amplifier and said reference input being an inventing input of said operational amplifier.

4. The system according to claim 3 wherein:

said drive current is in the form of successive pluralities of pulses said pluralities occurring periodically during periods spaced by intervals of time, and said reference input having means for providing at said first input a voltage corresponding to an average amplitude of said voltage generated across said control winding.

5. The system according to claim 1 wherein:

said motor comprises a stepper motor having at least two windings; and, said means for passing drive current passes said drive current alternately and in successive periods of time through said windings.

6. The system according to claim 5 wherein:

said means for passing drive current includes means for generating said drive current in successive groups of pulses, and said drive current controlling means includes means for controlling duration of said pulses.

7. The system according to claim 3 wherein said drive current controlling means includes:

a circuit for producing a feedback signal corresponding to a peak amplitude of said inductive signal output, and amplitude response means, responsive to said peak amplitude, for controlling said drive current to maintain said peak amplitude at a certain predetermined value corresponding to said predetermined motion of said shaft over a predetermined angular displacement in a certain period of time.

8. The system according to claim 5 further comprising:

optical scanner means for generating an optical beam and having at least one component connected to said shaft;

means for generating said drive current in successive groups of unipolar pulses and alternately applying said groups to different ones of said at least two windings to oscillate said shaft and scan said beam reciprocally over a predetermined scan angle; and, said drive current controlling means including means responsive to said inductive signal output for reducing scanning variations from said predetermined scan angle.

9. The system according to claim 1 wherein:

said means for passing drive current includes means for generating successive drive pulses as said drive current; and, said means for generating an inductive signal output comprises means for preventing transmission of said inductive signal output except for intervals occurring between said drive pulses.

10. The system according to claim 9 wherein said means for preventing transmission of said inductive signal output comprises:

means for gating said signal to select from said signal separate pulses corresponding to said voltage due to said inductive generation in said control winding.

11. The system according to claim 10 wherein said means for generating said successive drive pulses includes:

a programmed microprocessor for providing first trains of pulses and a second train of pulses which occur between said pulses of said first trains, means responsive to said first trains of pulses for generating said drive pulses, and means for operating said gating means with said second train of pulses.

12. The system according to claim 10 wherein said drive current controlling means further comprises:

means for providing a control voltage corresponding to a peak amplitude of said separate pulses; and, means responsive to said control voltage for varying a predetermined parameter of said drive pulses for controlling said predetermined motion of said output shaft.

13. The system according to claim 12 wherein said parameter of said drive pulses is duration.

14. The system according to claim 12 wherein:

said means for generating said successive drive pulses includes means for generating said drive pulses in successive groups passing through said control winding in opposite directions to oscillate said output shaft reciprocally over a given angular displacement for each of said opposite directions; and, said means responsive to said control voltage comprises means for reducing variations in said given angular displacement.

15. The system according to claim 14 further comprising:

means connected to said shaft for providing an optical beam oscillating reciprocally over a scan angle corresponding to said given angular displacement for scanning said beam across an object in a field of view.

16. The system according to claim 1 wherein said circuit, including an amplifier, for continuously receiving said signal, includes at least one resistor bias network at an input of said amplifier.

17. A motor control system for oscillating an output shaft of a motor about a predetermined angle of rotation, said motor having at least one winding, said system comprising:

means connected to said at least one winding for selectively passing current through said at least one winding to oscillate said shaft;

means for continuously sensing voltage generated across said at least one winding, said voltage generated due to current passing through said at least one winding and generated due to inductive generation, and for continuously providing a signal corresponding to said generated voltage;

output means for generating an output signal, wherein said output means includes an amplifier electrically biased to generate said output signal, and input means for continuously receiving said signal;

means responsive to said output signal for determining and amplifying a peak value of said output signal and outputting an analog control signal to a continuous feedback path; and means for comparing said analog control signal with a predetermined set value for controlling duration of said current through said at least one winding.

18. A motor control system according to claim 17, wherein said current comprises plural pulses.

19. A motor control system according to claim 17, wherein said at least one winding consists of only one winding and said comparing means controls duration and direction of said current.

20. A motor control system according to claim 17, wherein said at least one winding consists of two windings and said comparing means alternatingly passes said current through said two windings and controls duration of said current through each of said two windings.

* * * * *